(No Model.)
A. OTTO.
PRESERVING VESSEL.
No. 412,534. Patented Oct. 8, 1889.
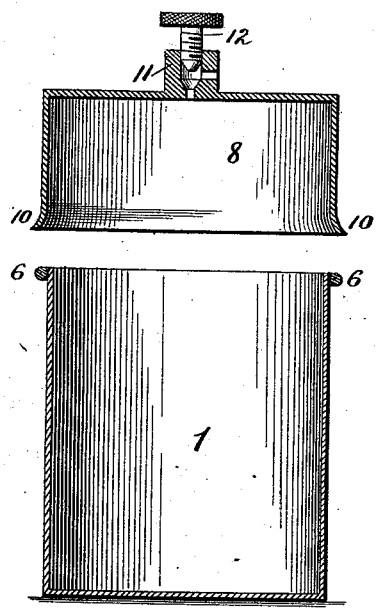
WITNESSES:
Fred G. Dieterich
Fred. H. Stearns,
INVENTOR:
Adolf Otto
BY
ATTORNEYS

UNITED STATES PATENT OFFICE.

ADOLF OTTO, OF NEUBUKOW, GERMANY.

PRESERVING-VESSEL.

SPECIFICATION forming part of Letters Patent No. 412,534, dated October 8, 1889.

Application filed December 5, 1888. Serial No. 292,701. (No model.)

*To all whom it may concern:*

Be it known that I, ADOLF OTTO, a subject of the Duke of Mecklenburg-Schwerin, residing at the city of Neubukow, in the German Empire, have invented a new and useful Preserving-Vessel, of which the following is a full, clear, and exact description, reference being had to the accompanying drawing, forming part thereof, in which the figure represents a vertical central section of my improved vessel.

This invention relates to that class of packing and storing vessels employed in preserving fruits, meats, vegetables, &c., in which, after the contents are inclosed, gas or steam generated therein is permitted to escape, and the vessel then hermetically sealed.

The invention has for its object to provide a preserving-vessel of this kind by means of which the vessel will be effectively sealed after the contents are inclosed and the gas or steam has escaped.

The invention consists in a preserving-vessel constructed and arranged as hereinafter described and claimed.

The lower part or body 1 of the vessel is cylindrical and open at its upper end and the upper section or cover 8 is of a slightly larger diameter, so as to slide over the upper end of the part 1, and the lower open end of the cover or upper section is flared outwardly, as at 10, so as to pass over a round gasket or ring 6 on the upper end of the lower part or body 1. This flaring mouth 10 greatly facilitates the telescoping of the two parts in either direction. After the flaring mouth passes over the gasket the gasket will roll between the two sections or parts of the vessel, thus lessening the friction and power required to telescope the two sections.

In order that the air may escape during the telescoping of the two sections of the vessel, I provide a vent on top of the cover, consisting of the internally-threaded tube 11, having a lateral opening, and the screw 12, working in said tube across the said opening.

Having thus described my invention, what I claim as new, and desire to secure by Letters Patent, is—

As an improved article of manufacture, a preserving-vessel consisting of two parts adapted to telescope together, with a gasket between them, one section having a flaring mouth to admit the gasket, and an adjustable vent-valve on one of the parts to facilitate the union and separation of the parts, as set forth.

ADOLF OTTO.

Witnesses:
  B. ROI,
  KARL BEILKE.